(No Model.)

G. S. DENNIS.
HAND CULTIVATOR HOE.

No. 485,372. Patented Nov. 1, 1892.

WITNESSES:
Clar. A. Williams.
Newton G. Leslie.

INVENTOR
George S. Dennis
BY
Lucius C. West
ATTORNEY.

THE NORRIS PETERS CO., PHOTO-LITHO., WASHINGTON, D. C.

UNITED STATES PATENT OFFICE.

GEORGE S. DENNIS, OF KALAMAZOO, MICHIGAN.

HAND CULTIVATOR-HOE.

SPECIFICATION forming part of Letters Patent No. 485,372, dated November 1, 1892.

Application filed May 28, 1892. Serial No. 434,714. (No model.)

*To all whom it may concern:*

Be it known that I, GEORGE S. DENNIS, a citizen of the United States, residing at Kalamazoo, county of Kalamazoo, and State of Michigan, have invented a new and useful Hand Cultivator-Hoe, of which the following is a specification.

This invention relates to that class of hand-hoes which have a series of teeth similar to a cultivator.

One of the objects of this invention is to construct the teeth and their bars of the side wings of the cultivator integral and fan-shaped, so that the tooth-bars of said wings diverge rearwardly from each other.

Another object is to combine these wings with a suitable frame in such a manner that the wings may be shifted to opposite sides by swinging around on a forward fulcrum.

A further object consists in adjustably combining these wings with a peculiarly-constructed sector-shaped frame, the design being to make a neat light implement for hand use with but few parts and no bolts.

Figure 1:
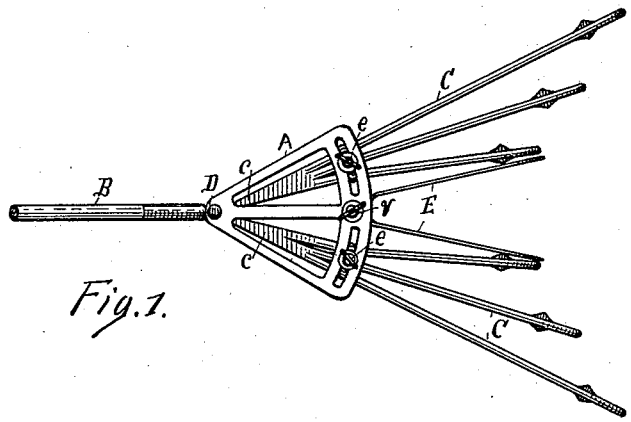
Figure 2:
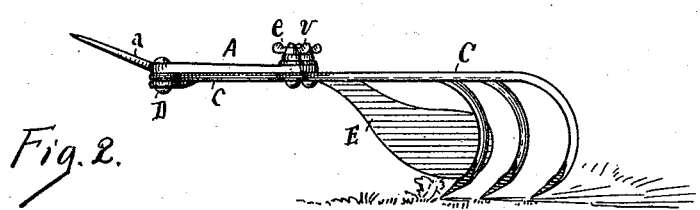
Figure 3:
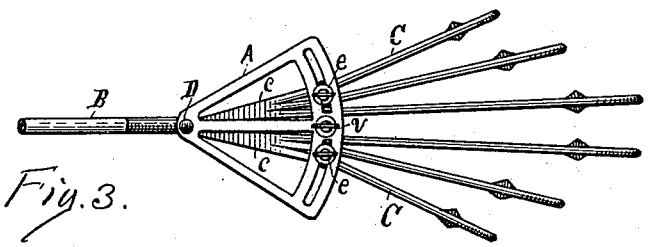
Figure 4:
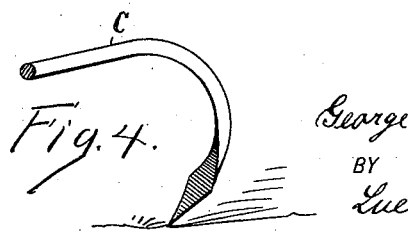

In the drawings forming a part of this specification, Figure 1 is a plan view; Fig. 2, a side elevation of Fig. 1; Fig. 3, a plan view illustrating the reversed adjustment of the wings; and Fig. 4 is a broken enlarged perspective, below described.

Referring to the lettered parts of the drawings, A represents a three-sided or sector-shaped plate or frame having an integral forward-extending prong $a$, Fig. 2, to which the handle B is attached.

The wings consist of a series of tooth-bars C, curved downward at their rear ends and bearing suitable teeth. The bars of these wings converge and integrally blend together at the forward end, as at $c$. Hence they diverge toward the rear end and are graduated in length, as in the drawings, so that some of the teeth trail farther to the rear than others. The forward ends of these wings are pivoted to the frame A at D, one resting on the other and both pivoted by the same pivot, by which means the wings can be swung around on said pivot to opposite sides, so as to adjust the cultivator for drawing the dirt away from the row of vegetation, as in Figs. 1 and 2, or toward the row, as in Fig. 3, Fig. 3 illustrating the implement as it appears after this adjustment has taken place. Fig. 3 also illustrates the implement when used simply for pulverizing the soil, either before seeding or between the rows of vegetation. The wings in this figure may be separated farther apart, so as to operate on each side of the row, the same as in Fig. 1.

The wings are attached to the rear side of the frame A by means of thumb-screws $e$, which thumb-screws pass up through the wings and through the elongated slots in the frame, as shown in Figs. 1 and 3. By loosening these thumb-screws the wings may be set nearer together or farther apart, as desired, by swinging them slightly on their forward fulcrum D, said thumb-screws and also the shields E being removed when desiring to swing the wings around from one side to the other, so as to reverse their position, after which the said thumb-screws would be again attached to place. When these wings are swung to alternate sides, as stated, one is swung from the side it occupied to the other side, while the other is swung around beneath the handle to the other side.

At E is shown a shield, of the ordinary V or U shape, detachably attached to the rear bar of the frame A by thumb-screw $v$, so that the sides of said shield will come on each side of the row of vegetation to protect same. This shield is more especially employed when the vegetation is small and when the wings are used in the position shown in Fig. 1, so as to protect the plants from being covered up or interfered with by the soil. These shields may be employed when the wings are in the reversed position, as in Fig. 3, if desired. These shields consist of two parts, the forward ends of which parts are both attached to the frame A by the thumb-screw $v$, so that by loosening said thumb-screw said shield may be made wider or narrower, as desired.

When desired, the shield E may be removed and other bars bearing teeth be attached to the frame A by the thumb-screw $v$, so as to locate teeth in the space otherwise occupied by the shield.

A desirable form of the rear end of the tooth-bars and the tooth is shown in Fig. 4.

Having thus described my invention, what I claim as new, and desire to secure by Letters Patent of the United States, is—

1. A hand cultivator-hoe consisting of a handled frame and the wings comprising a series of diverging rearwardly-extending bars bearing teeth, said wings being pivotally attached at the same point by a single pivot to the handled frame at their forward end and adjustably attached to the rear end of the frame, so as to be swung laterally, substantially as set forth.

2. A hand cultivator-hoe comprising a handled frame, wings consisting of a series of rearwardly-extending diverging bars bearing teeth, said wings being attached at their forward ends to the frame by the same pivot and adjustably and detachably attached to the rear end of said frame, and a shield attached to the rear end of the frame between said wings, substantially as set forth.

3. The combination of a handled frame and two wings bearing teeth, said wings being fulcrumed at their forward end to the frame by the same pivot and detachably connected to the rear end of the frame, whereby one of the wings may be swung laterally to the opposite side of the cultivator and the other wing swung around beneath the handle to the other side, substantially as set forth.

4. The combination of a sector-shaped frame provided with the integral prong, a handle attached to said prong, the rear side of said frame being provided with the slots, wings consisting of a series of bars bearing teeth, said bars converging to the forward end and fulcrumed to the frame by the same pivot, and thumb-screws passed through the slots of the frame and the wings adjustably and detachably connecting said wings with the frame, substantially as set forth.

In testimony to the foregoing I have hereunto subscribed my name in the presence of two witnesses.

GEORGE S. DENNIS.

Witnesses:
NEWTON G. LESLIE,
W. L. ROOT.